United States Patent [19]

Chen et al.

[11] Patent Number: 5,393,376
[45] Date of Patent: Feb. 28, 1995

[54] METHOD OF MAKING POLE TIP STRUCTURE FOR THIN FILM MAGNETIC HEADS

[75] Inventors: Mao-Min Chen; Kochan Ju, both of San Jose; Neil L. Robertson, Campbell; Po-Kang Wang, San Jose, all of Calif.

[73] Assignee: International Business Machines Corporation, Armonk, N.Y.

[21] Appl. No.: 175,886

[22] Filed: Dec. 30, 1993

[51] Int. Cl.6 .......................... B44C 1/22; C03C 15/00; C03C 25/00
[52] U.S. Cl. .................................. 156/643; 156/657; 156/659.1; 156/656
[58] Field of Search ............... 156/643, 651, 653, 656, 156/657, 659.1; 29/603; 360/126

[56] References Cited

U.S. PATENT DOCUMENTS

| | | | |
|---|---|---|---|
| 4,670,972 | 6/1987 | Sakakima | 29/603 |
| 4,837,924 | 6/1989 | Lazzari | 29/603 |
| 4,912,584 | 3/1990 | Mallary et al. | 360/126 |
| 4,949,207 | 8/1990 | Lazzari | 360/119 |
| 5,059,278 | 10/1991 | Cohen et al. | 256/656 X |
| 5,062,196 | 11/1991 | Deroux-Dauphin | 29/603 |
| 5,075,956 | 12/1991 | Das | 29/603 |
| 5,090,111 | 2/1992 | Lazzari | 29/603 |
| 5,200,056 | 4/1993 | Cohen et al. | 156/656 X |

*Primary Examiner*—William Powell
*Attorney, Agent, or Firm*—Baker, Maxham, Jester & Meador

[57] ABSTRACT

A simplified method is provided for making a thin film magnetic head pole tip structure which includes a sidegap G sandwiched between pole tips PT1 and PT2. The method includes depositing bottom and top seedlayers with an insulation layer sandwiched therebetween. The pole tip PT2 is frame plated on top of the top seedlayer with top and bottom film surfaces which are bounded in part by a pair of spaced-apart sidewalls. The second seedlayer and preferably a depth portion of the insulation layer are removed with the exception of width portions of these layers below the pole tip PT1. A gap insulation layer is deposited on a sidewall of the pole tip PT1 to form the sidegap. The insulation layer with the exception of a portion of an insulation layer below the pole tip PT1 is removed to expose a portion of the bottom seedlayer adjacent to the pole tip PT1 where the pole tip PT2 is to be formed. The pole tip PT2 is then frame plated on top of the exposed portion of the first seedlayer adjacent to the sidegap to complete the desired thin film magnetic head.

20 Claims, 6 Drawing Sheets

METHOD OF MAKING POLE TIP STRUCTURE FOR THIN FILM MAGNETIC HEADS

BACKGROUND OF THE INVENTION

1. Field of the Invention

The present invention relates to a method of making a pole tip structure for a thin film magnetic head, and more particularly, to a method of making which is not constrained by the shortness of the length of the gap between the pole tips and does not require an extra step to planarize the pole tips.

2. Description of the Related Art

A horizontal thin film magnetic head differs from the typical pancake type thin film magnetic head in several respects. In the horizontal thin film magnetic head, the thickness of the pole tip layers establish the track pitch of the head, whereas in the pancake type head the track pitch is established by trimming the widths of the pole tip layers. Further, the horizontal thin film magnetic head is mounted on a sidewall of a slider whereas the pancake type head is mounted on a trailing edge of a slider. Accordingly, the direction of movement of magnetic media below the horizontal magnetic head is generally parallel to the planes of the thin films of the horizontal head whereas the direction of movement of the magnetic media with respect to the pancake type head is generally perpendicular to the planes of the thin films of the pancake type head. A distinct advantage of the horizontal thin film magnetic head over the pancake type thin film magnetic head is that a plurality of horizontal thin film magnetic heads can be combined to write closely packed tracks for high density multitrack recording, such as high definition television (HDTV).

The method of making the horizontal thin film magnetic head is somewhat different from the method of making the pancake type thin film magnetic head. With the horizontal head, the thin films for the pole tips PT1 and PT2 are deposited generally in a common plane with an insulating gap therebetween. As stated above, the track pitch is determined by the thickness of the pole tip thin films. With the pancake type head, thin films are deposited in sequence, one on top of the other, the first thin film being the pole tip PT1, the next thin film being the insulative gap G and the third thin film being the pole tip PT2. These thin film layers are then trimmed in the pole tip region for defining the widths of the pole tips to establish the track pitch of the head. An advantage of making a horizontal thin film magnetic head is that pole tip trimming is not required in order to define the track pitch of the head.

Several prior art methods have been employed for constructing the horizontal thin film magnetic head. The first method has been to construct the gap, which in a horizontal head is referred to as a sidegap. The pole tips PT1 and PT2 are then deposited on each side of the gap. A serious problem with this method is maintaining the mechanical integrity of the gap while it is freestanding as a pillar before plating the pole pieces PT1 and PT2. It is desirable to keep the length of the gap as small as practical to increase linear density (bit density) of the head. For example, if the length of the gap is 2000 angstroms and the height of the freestanding gap is 4 $\mu$m-5 $\mu$m to accommodate the pole pieces, it is unlikely that the freestanding gap will remain in place until the pole pieces are plated. The other prior art method frame plates the first pole piece, forms a gap layer and then sputter-deposits the second pole piece. With this method, the sputtered second-pole piece presents a high topography on top of the first pole piece which must be removed by some method, such as lapping. Planarization by lapping is difficult to control. Further, lapping is not workable when the pole pieces are in a sunken location with respect to the substrate. The aforementioned fabrication problems associated with horizontal thin film magnetic heads apply equally as well to ring-type thin film magnetic heads shown in FIGS. 28a and 28b.

SUMMARY OF THE INVENTION

The present invention simplifies the method of making the pole tip structure for a horizontal or ring-type thin film magnetic head. This is accomplished by employing a pair of seedlayers wherein each seedlayer is used on a selective basis to plate one or the other of the pole tips of the magnetic head. In thin film fabrication, a seedlayer is a conductive layer which is used as a return path for plating in an electrolytic solution. In the present invention, a bottom seedlayer is deposited, an insulation is deposited on top of the bottom seedlayer and a top seedlayer is deposited on top of the insulation layer. With this arrangement the insulation layer is essentially sandwiched between the top and bottom seedlayers. A first pole tip is frame plated on top of the top seedlayer. The top seedlayer and preferably a portion of the insulation layer are then removed adjacent to the first pole tip and a gap layer is deposited on a sidewall of the first pole tip to form a sidegap. The insulation layer is then removed down to the bottom seedlayer along the side of the first pole tip. The bottom seedlayer is then employed in frame plating the second pole tip adjacent to the sidegap thereby completing the construction of the horizontal or ring-type thin film magnetic head. This method produces well-aligned pole tips with a sidegap of any desired length without the requirement to planarize the pole pieces.

An object of the present invention is to overcome the problems associated with prior art methods of making horizontal or ring-type thin film magnetic heads.

Another object is to provide a method of making a horizontal or ring-type thin film magnetic head which is not constrained by the shortness of the length of the sidegap and does not require an extra process step to planarize the pole tips.

A further object is to provide a simplified method of making a horizontal or ring-type thin film magnetic head where the steps of the method automatically align the pole tips.

Yet another object is to provide a horizontal or ring-type thin film magnetic head which has well-aligned pole tips and has double seedlayers, both seedlayers being directly below a first pole tip and only one of the seedlayers being directly below the second pole tip.

Other objects will become apparent when considered in light of the following description of the invention.

DETAILED DESCRIPTION OF THE PREFERRED EMBODIMENTS

Figure 1:
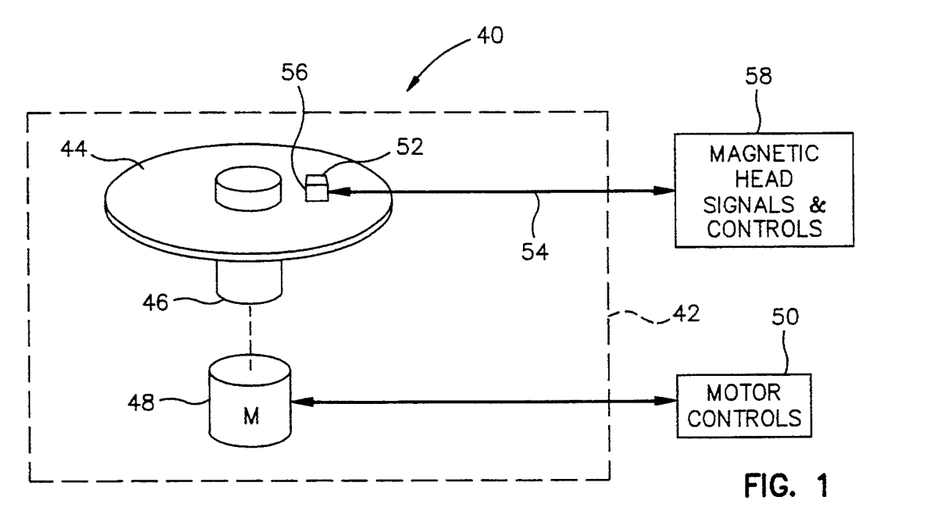
FIG. 1 is a schematic illustration of a magnetic disk drive which employs one or more of the horizontal thin film magnetic heads of the present invention.
Figure 2:
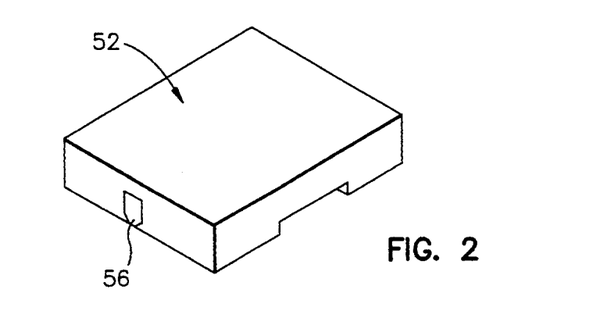
FIG. 2 is an isometric illustration showing one of the horizontal thin film magnetic heads mounted on the side of a slider.

Referring now to the drawings, wherein like reference numerals designate like or similar parts throughout the several views, there is illustrated in FIG. 1 a magnetic disk drive 40 which has numerous components located within a housing 42. Located within the housing is a magnetic disk 44 which is mounted on a spindle 46. A motor 48, which is controlled by motor controls 50, rotates the magnetic disk 44 via the spindle 46. A slider 52, which is supported by a suspension 54, floats on a cushion of air (air bearing) slightly above the surface of the magnetic disk 44 when the disk is rotated. As shown in FIGS. 1 and 2, a horizontal thin film magnetic head 56 is mounted on a side of the slider 52 with its pole tips facing the magnetic disk 44 in a transducing relationship for writing and/or reading magnetic signals with respect to the disk. Head signals as well as signals to implement slider positioning are processed by processor 58. If desired, a plurality of the horizontal thin film magnetic heads 56 can be mounted on the side of the slider if close packed tracks are required for high density transducing such as HDTV. Alternatively, one or more horizontal thin film magnetic heads 56 can be employed for transducing with respect to a magnetic tape. The employment of close packed thin film magnetic heads for a magnetic disk or a magnetic tape is fully described in co-pending application entitled "Close Packed Magnetic Head Linear Array" filed by M. M. Chen et al.

Figure 3:
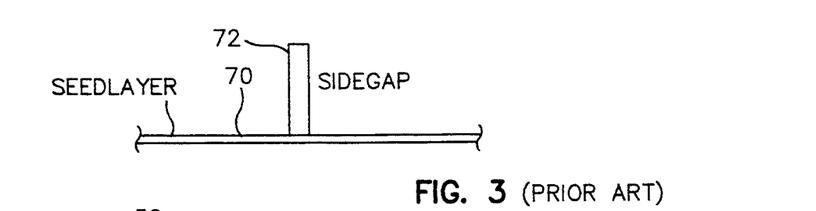
FIGS. 3 and 4 are air bearing surface (ABS) views of one prior art method for making a horizontal thin film magnetic head.
Figure 4:
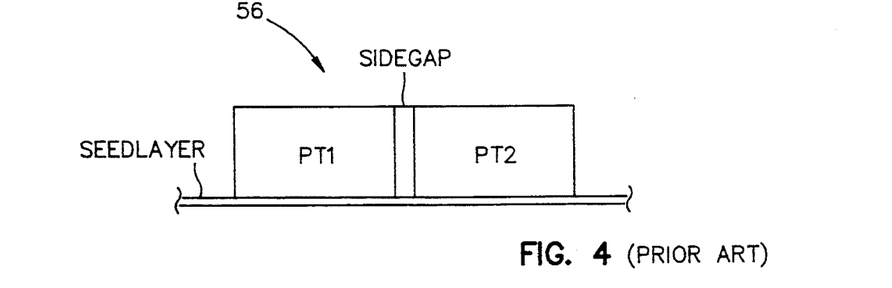

A prior art method of making a horizontal thin film magnetic head 56 is illustrated in FIGS. 3 and 4. First a seedlayer 70 is deposited as illustrated in FIG. 3. The seedlayer will serve as the return path for electroplating the pole tips which will come after formation of a sidegap. The sidegap 72 is formed on top of the seedlayer 70 with a desired length and height. The problem with this method is that the sidegap 72 is a freestanding pedestal which must remain in place until the pole tips are plated on each side thereof. Accordingly, the length of the sidegap 72 and/or its height must be limited so that it will not fall down before the pole tips are plated. With these constraints, the sidegap 72 is constructed and the pole tips PT1 and PT2 are plated using the seedlayer 70 as a return path in the electroplating process. This method would be unworkable if the length of the sidegap was in the order of 2000 angstroms and its width (height of pedestal) was in the order of 4 $\mu$m to 5 $\mu$m. As stated hereinabove, it is important to minimize the length of the sidegap to increase the linear density of the magnetic head.

Figure 5:
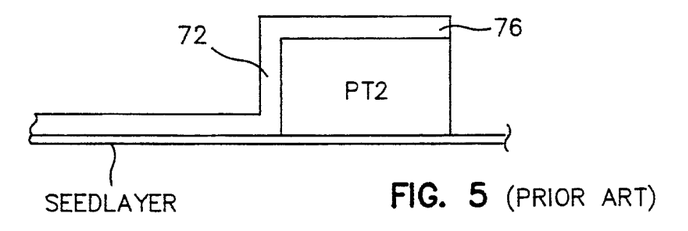
FIGS. 5, 6, and 7 are ABS views of another method for making a horizontal thin film magnetic head.
Figure 6:
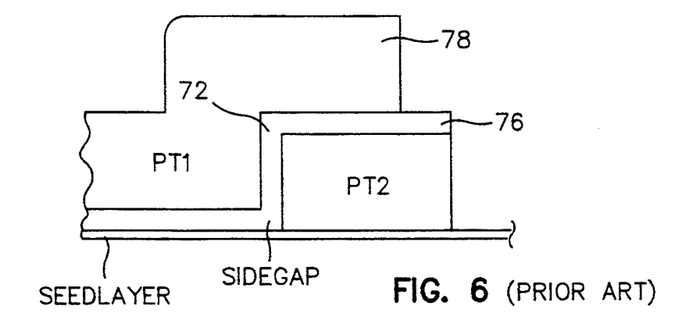
Figure 7:
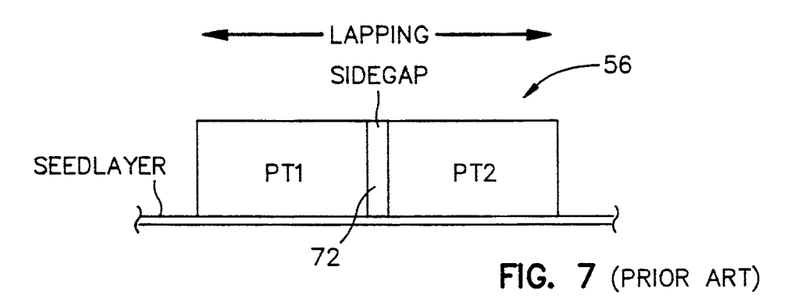

Another prior art method of constructing a horizontal thin film magnetic head is illustrated in FIGS. 5, 6, and 7. First a pole tip PT2 is formed by any suitable means such as frame plating, as illustrated in FIG. 5. Next, an insulative layer 76 is deposited by any suitable means such as sputtering. As shown in FIG. 6, a magnetic layer 78 is then deposited by sputtering. This magnetic layer 78 forms the pole tip PT1 along the side of the sidegap 72. Because of the sputtering, however, the magnetic layer 78 is also deposited on top of the pole tip PT2 causing a high topography, which is undesirable for the pole tip structure. In order to overcome this problem, the prior art method planarizes the pole tip structure by removing the magnetic layer 78 above the pole tip PT2 by lapping or etching. Either of these process steps is difficult to perform in a precise manner. Further, if the pole tips are sunken or recessed in a substrate, the simpler lapping process cannot be employed.

Figure 8:
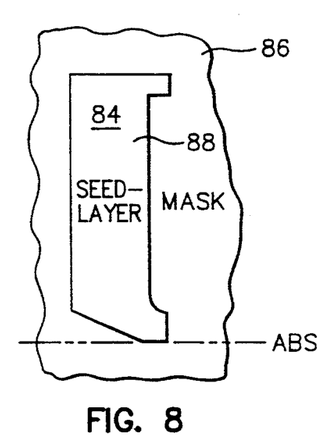
FIG. 8 is a planar illustration of the first step involved in the method of the invention.
Figure 9:
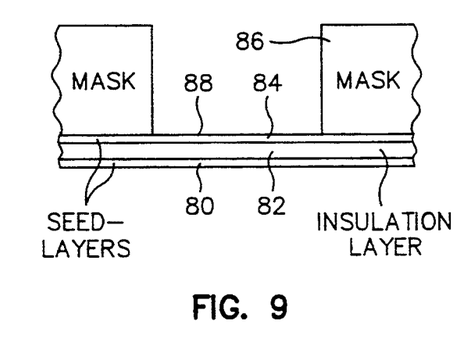
FIG. 9 is a view taken along the ABS of FIG. 8.

The present method of making the horizontal thin film magnetic head 56 is commenced with the steps illustrated in FIGS. 8 and 9. As shown in FIG. 9, the first step is to deposit a bottom seedlayer 80, the next step is to deposit an insulation layer 82 on top of the bottom seedlayer 80 and the next step is to deposit a top seedlayer 84 on top of the insulation layer 82. With this construction, the insulation layer 82 is sandwiched directly between the bottom and top seedlayers 80 and 84. Both of the seedlayers 80 and 84 are constructed of conductive material to provide a return path for electroplating pole pieces to be described in detail hereinafter. Further, it is desirable that the seedlayer 80 be constructed of a non-magnetic conductive material, such as NiP or NiMo, so as to prevent magnetic coupling with one of the pole pieces to be described hereinafter. Next, a photoresist mask 86 is formed on top of the top seedlayer, 84 exposing an area 88 of the top seedlayer 84 for the location of a pole piece P1 and its pole tip PT1 to be described hereinafter. The layers 80, 82 and 84 may be laid on a substrate (not shown).

Figure 10:
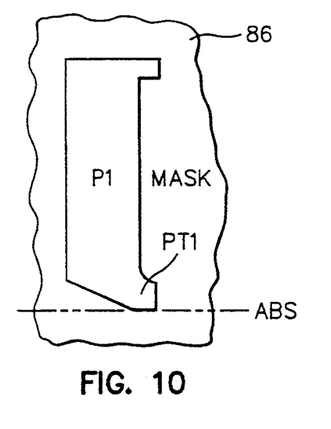
FIGS. 10, 11, 12, and 13 are similar to FIGS. 8 and 9 except they involve subsequent steps of the method.
Figure 11:
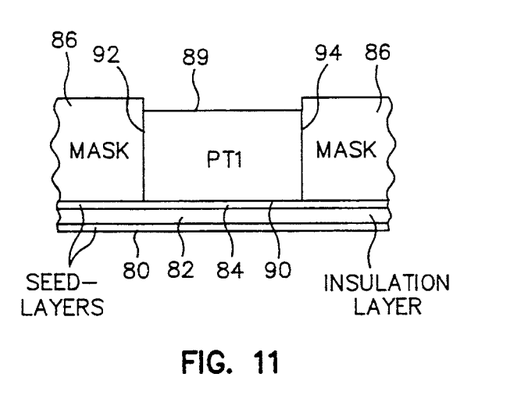
Figure 12:
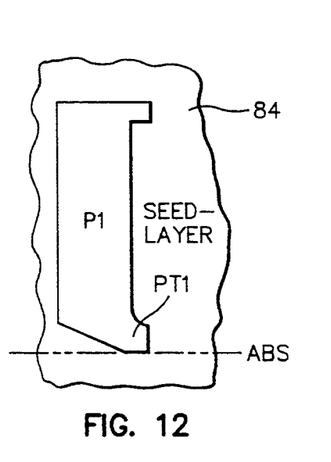
Figure 13:
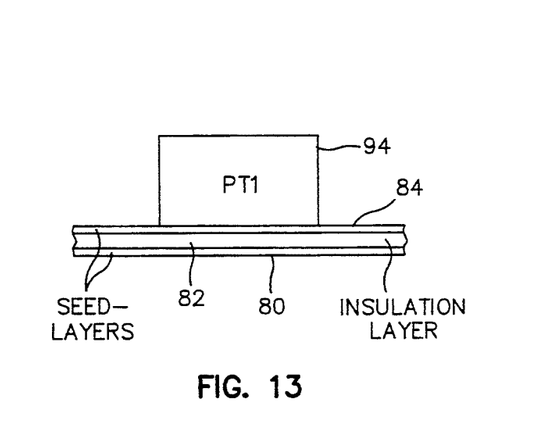
Figure 14:
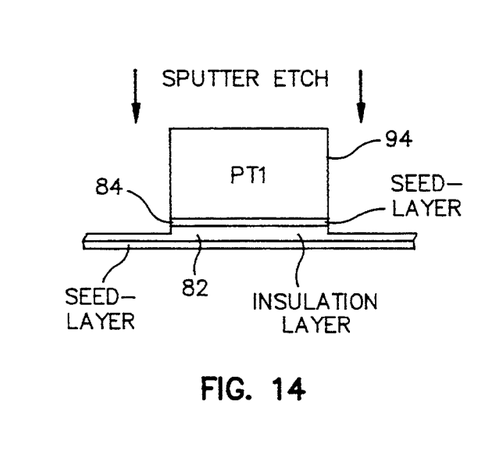
FIGS. 14 and 15 are ABS views of the partially completed pole tip structure showing subsequent steps in the method.

The next step of the present method is illustrated in FIGS. 10 and 11. Magnetic material, such as permalloy, is plated within the area 88 of the photoresist mask 86 to form the first pole piece P1 and its pole tip PT1. The top seedlayer 84 is employed for electroplating the pole piece P1. Pole tip PT1 is formed with top and bottom film surfaces 89 and 90 which are bounded in part by sidewalls 92 and 94. The next step is illustrated in FIGS. 12 and 13. This step is simply the removal of the photoresist mask 86 which can be accomplished by dissolving it in a solution. The next step is illustrated in FIG. 14. In this step, the top seedlayer 84 and preferably, a portion of the thickness of the insulation layer 82 are removed with the exception of a portion of the seedlayer 84 and a portion of the insulation layer 82 directly below the pole tip PT1. It is preferable that this removal be immediately adjacent to the sidewall 94 of the pole tip PT1 to form the layers 82 and 84 with sidewalls which are aligned with the sidewall 94. This requires a highly directional removal process. The preferred method of removal is by sputter etching which is directed vertically downward as illustrated in FIG. 14. Sputter etching will remove material from horizontal surfaces and will leave material in place on vertical surfaces. Other removal processes may be ion beam milling or reactive ion etching (RIE). The reason that the insulation layer 82 is partially removed or notched, as illustrated in FIG. 14, is to prevent any electrical connection between the top seedlayer 84 and the pole tip PT2, which is to be subsequently formed.

Figure 15:
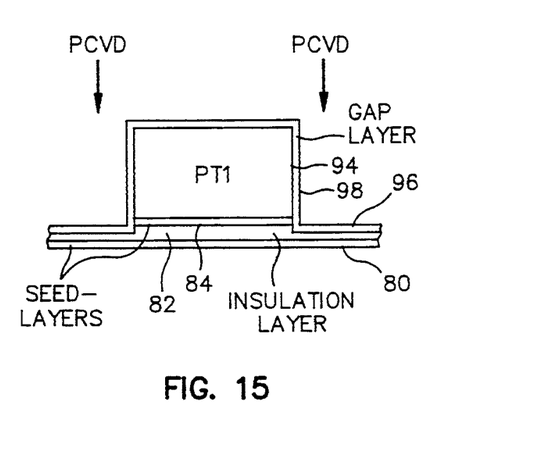

The next step in the method is illustrated in FIG. 15. This step is depositing an insulation layer 96 which is material for the sidegap 98. A preferred process for depositing the insulation layer 96 is plasma chemical vapor deposition (PCVD). This deposition process deposits the insulation layer equally on horizontal and vertical surfaces as illustrated in FIG. 15. Another suitable deposition process is plasma enhanced chemical vapor deposition (PECVD). It is desirable that the sandwiched insulation layer 82 and the insulation layer 96 be constructed of the same material. A suitable material for both of these layers can be selected from the group of silicon dioxide $SiO_2$, and silicon nitride $Si_3N_4$ and/or carbon-based materials which can be deposited by chemical vapor deposition. Materials from this group are anistropically etchable by reactive ion etching (RIE).

Figure 16:
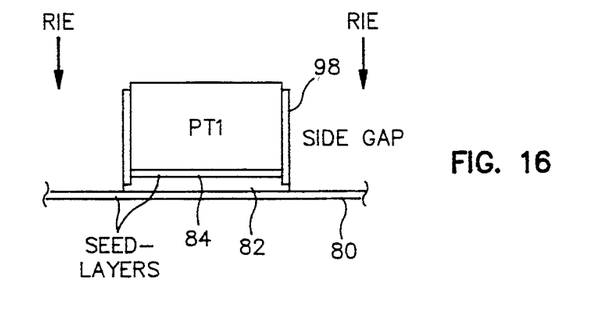
FIG. 16 is an ABS view of the partially completed pole tip structure after reactive ion etching the top seedlayer and a portion of the insulation layer.

The next step in the method is illustrated in FIG. 16. This step is the removal of the insulation layer 96 with the exception of the sidegap 98 and the removal of the insulation layer 82 with the exception of a portion of the insulation layer directly below the pole tip PT1. This removal exposes a portion of the bottom seedlayer 80 adjacent to the pole tip PT1 where the pole tip PT2 is to be formed. This removal process is preferably accomplished by reactive ion etching (RIE) directed in a vertically downward direction because of its high directivity capability as discussed hereinabove. Other processes for removal may be sputter etching or ion beam milling. With reactive ion etching, the sidegap 98 and the insulation layer 82 provide a desirable vertical wall for the next steps of the method.

Figure 17:
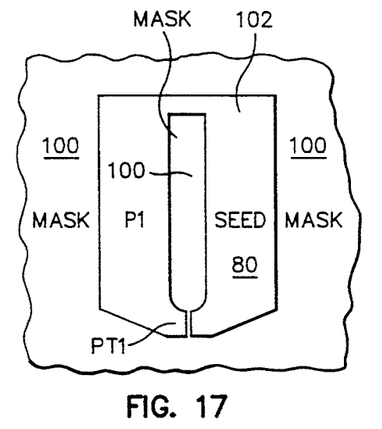
FIGS. 17 through 22 are similar to FIGS. 8 and 9 except they show subsequent steps in the method of the invention, with FIG. 22 showing one embodiment of the completed pole tip structure for the horizontal thin film magnetic head.
Figure 18:
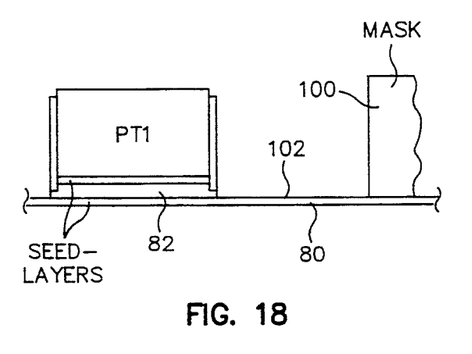
Figure 19:
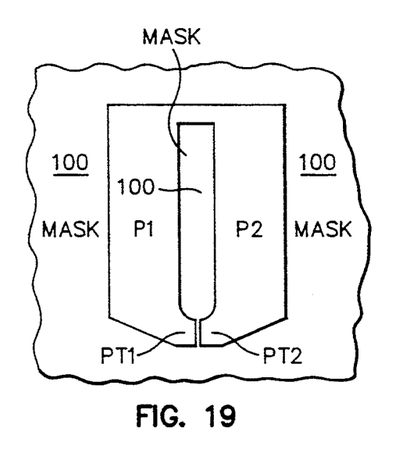
Figure 20:
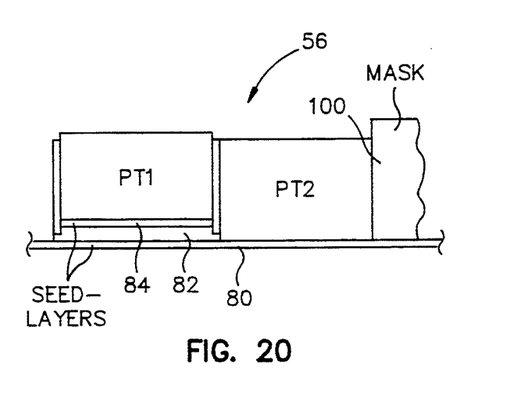
Figure 21:
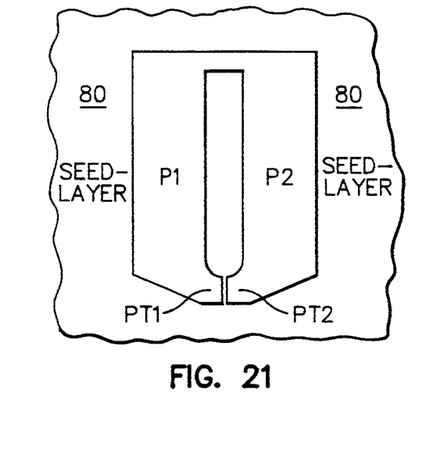
Figure 22:
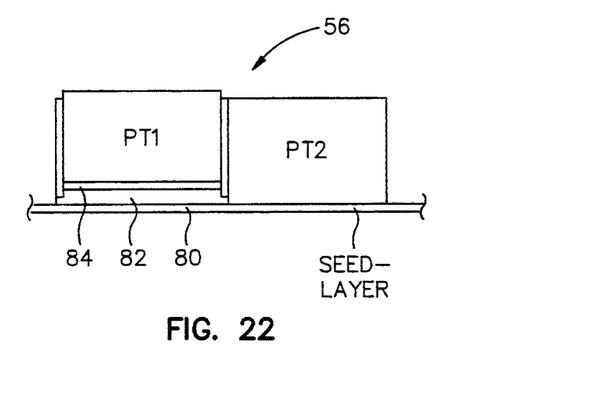

The next steps of the method are illustrated in FIGS. 17 and 18. A photoresist mask 100 is formed exposing a portion 102 of the bottom seedlayer 80 for plating the second pole P2 and its pole tip PT2. The next step is shown in FIGS. 19 and 20. This step is frame plating magnetic material within the photoresist mask 100 to form the second pole P2 and its pole tip PT2. The next step is illustrated in FIGS. 21 and 22. This step is the removal of the photoresist mask 100 by dissolving it in a solution. This leaves the desired pole tip structure 56 as illustrated in FIG. 22.

The pole tip structure 56, shown in FIG. 22, is substantially self-aligned during the construction steps except for the slight offset due to the thicknesses of the insulation layer 82 and the top seedlayer 84. This offset can be kept negligible, however, by making these thicknesses small in comparison to the thickness of the magnetic layers for the pole tips PT1 and PT2. For instance, the thickness of the layer 82 is about 1000–2000 Angstroms and the thickness of the layer 84 is about 800 Angstroms as compared to the thickness of each of the magnetic layers for the pole tips PT1 and PT2, which is about 3 $\mu$m. The resultant pole tip structure 56 is unique in that the top and bottom seedlayers 84 and 80 with an insulation layer 82 sandwiched therebetween are directly below the first pole tip PT1 and the bottom seedlayer 80 is directly below the second pole tip PT2.

Figure 23:
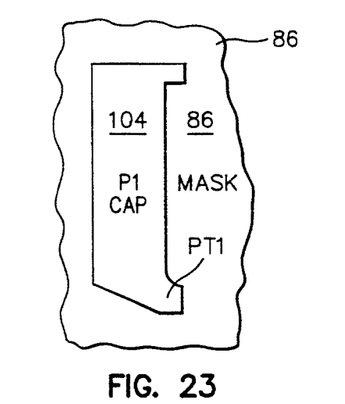
FIGS. 23 through 26 show a modification to the steps of the method illustrated in FIGS. 10 through 13.
Figure 24:
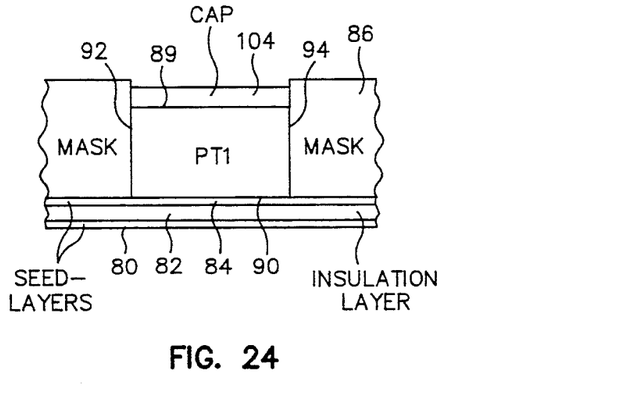
Figure 25:
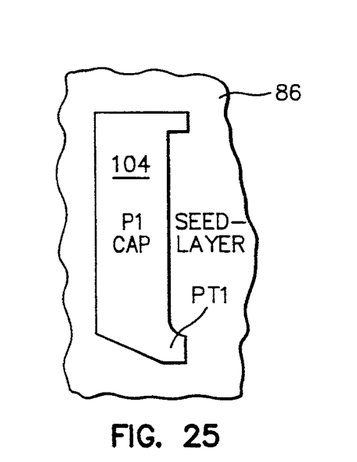
Figure 26:
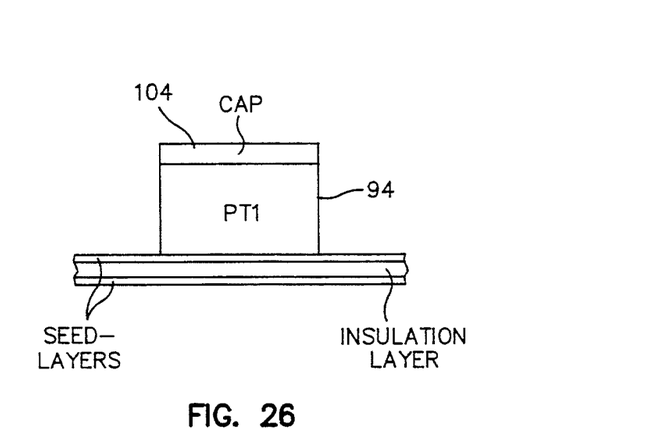
Figure 27:
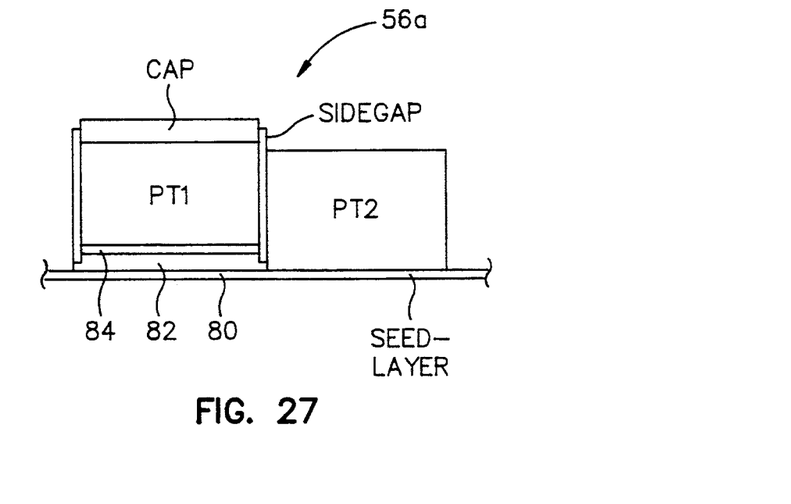
FIG. 27 is an ABS view of another embodiment of the pole tip structure for the horizontal thin film magnetic head as modified by the steps shown in FIGS. 22 through 25.

A modification of the present invention is illustrated in FIGS. 23 through 26 which results in a modified pole tip structure 56a shown in FIG. 27. FIGS. 23 and 24 illustrate a modification of the step shown in FIGS. 10 and 11. The modification is to frame plate a cap 104 on top of the pole piece P1 and its pole tip PT1. The cap 104 is a non-magnetic conductive layer which protects the pole piece P1 and the pole tip PT1 during the frame plating of the pole piece P2 and its pole tip PT2 (see FIGS. 19 and 20). Some plating solutions will etch an existing conductive layer while it is plating another conductive layer. The cap 104 will prevent this from occurring. A suitable material for the cap 104 is copper. Copper can be subsequently removed from the pole tip PT1 by etching it without damaging the pole tip. If it is desired to leave the cap 104 in place in the final head, it must be stable against corrosion since it will be exposed at the ABS. A suitable material for such a cap is nickel-phosphorus NiP. A cap 104, which is left in the final head, is illustrated in the subsequent steps of the modified method of construction. The next step is illustrated in FIGS. 25 and 26 where the photoresist mask 86 is removed leaving the pole tip PT1 with its cap 104. The remainder of the steps for the modified method would be the same as the first method shown in FIGS. 17 through 22 which results in the pole tip structure 56a illustrated in FIG. 27. The only essential difference between the pole tip structure illustrated in FIG. 27 over the pole tip structure illustrated in FIG. 22 is that the pole tip structure illustrated in FIG. 27 has a cap 104 on top of the pole tip PT1.

It is now readily apparent that the present invention provides a Unique and greatly simplified method of making a horizontal thin film magnetic head. The process is not constrained by the shortness of the length of the sidegap nor does it require lapping or etching to planarize the pole tips PT1 and PT2.

Figure 28A:
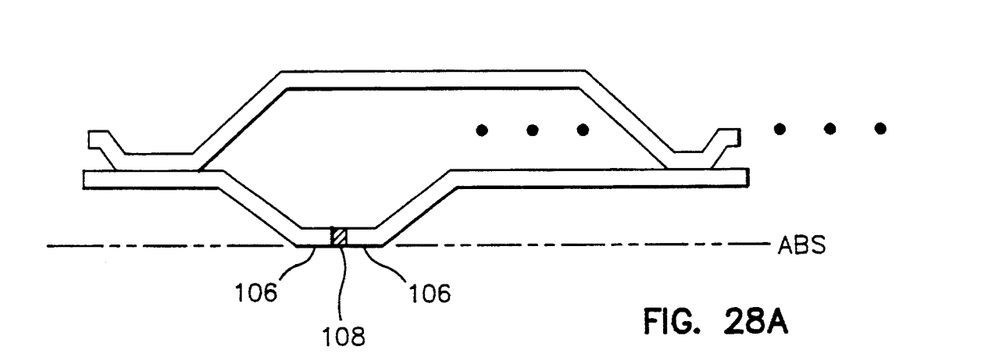
FIGS. 28a and 28b are exemplary ring-type magnetic heads which can be fabricated in accordance with the teachings of the present invention.
Figure 28B:
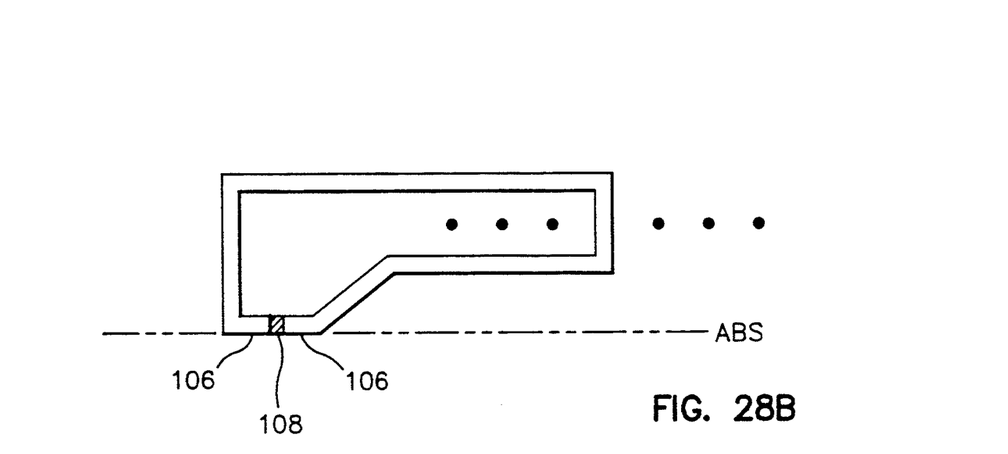

Further, it is readily apparent that the present invention is equally useful for the fabrication of other thin film magnetic head designs wherein the pole tips are co-planar and separated by an upstanding vertical gap layer. For example, the present invention greatly simplifies the fabrication of ring-type magnetic head designs as shown in FIGS. 28a and 28b wherein the magnetic head is formed within or integral with the body of a slider and the pole tips 106 and gap layer 108 are co-planar with the slider ABS.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of making pole tips PT1 and PT2 for a thin film magnetic head with a sidegap G located between the pole tips PT1 and PT2, the method comprising the steps of:

depositing a bottom seedlayer;
depositing an insulation layer on top of the bottom seedlayer;
depositing a top seedlayer on top of the insulation layer;

frame plating the pole tip PT1 on top of the top seedlayer, the pole tip PT1 having top and bottom film surfaces bounded in part by a pair of spaced apart sidewalls;

removing the top seedlayer with the exception of the top seedlayer below the pole tip PT1;

depositing a gap insulation layer on the insulation layer and on a sidewall of the pole tip PT1, the deposition of the gap insulation layer on the sidewall forming said sidegap G;

removing the gap insulation layer with the exception of the gap insulation layer which is deposited on the sidewall of the pole tip PT1 to form said sidegap;

removing the insulation layer with the exception of the insulation layer below the pole tip PT1 to expose a portion of the bottom seedlayer adjacent to the pole tip PT1 where the pole tip PT2 is to be formed; and frame plating the pole tip PT2 on top of the exposed portion of the bottom seedlayer adjacent to said sidegap.

2. A method as claimed in claim 1 including:
after the step of removing the top seedlayer, removing a portion of the thickness of the insulation layer with the exception of the insulation layer below the pole tip PT1.

3. A method as claimed in claim 2 including:
the steps of removing the top seedlayer and a portion of the thickness of the insulation layer including a step of etching the top seedlayer and a portion of the thickness of the insulation layer, and
the steps of removing the gap insulation layer and the insulation layer including a step of etching the gap insulation layer and the insulation layer.

4. A method as claimed in claim 3 including:
the step of etching the top seedlayer and a portion of the thickness of the insulation layer being accomplished by sputter etching; and
the step of removing the gap insulation layer and the insulation layer being accomplished by reactive ion etching.

5. A method as claimed in claim 2 including:
the step of depositing the gap insulation layer being accomplished by plasma chemical vapor deposition.

6. A method as claimed in claim 2 including:
the step of frame plating the pole tip PT1 including frame plating a cap layer on top of the pole tip PT1.

7. A method as claimed in claim 6 including:
the cap layer being constructed of copper.

8. A method as claimed in claim 6 including:
the cap layer being constructed of NiP.

9. A method as claimed in claim 2 including:
the insulation layer and the gap insulation layer being constructed of the same material.

10. A method as claimed in claim 9 including:
the material of the insulation layer and the gap insulation layer being selected from the group of $SiO_2$ and $Si_3N_4$.

11. A method as claimed in claim 2 including:
the bottom seedlayer being a nonmagnetic material.

12. A method as claimed in claim 2 including:
the step of depositing the top seedlayer comprising depositing a layer of conductive material so that the bottom seedlayer is conductive;
the step of frame plating including forming a photoresist mask which exposes an area of the top seedlayer for the location of the pole tip PT1 and employing the conductive top seedlayer to plate a layer of magnetic material on said area of the top seedlayer to form said pole tip PT1;
the step of depositing the bottom seedlayer comprising depositing a layer of conductive material so that the bottom seedlayer is conductive; and
the step of frame plating the pole tip PT2 comprising the steps of forming a photoresist mask which exposes an area of the bottom seedlayer for location of the pole tip PT2, said area of the bottom seedlayer being adjacent to the pole tip PT1, and employing the conductive bottom seedlayer to deposit a layer of magnetic material on said area of the bottom seedlayer to form the pole tip PT2.

13. A method as claimed in claim 12 including:
the steps of removing the top seedlayer and a portion of the thickness of the insulation layer including a step of etching the top seedlayer and a portion of the thickness of the insulation layer, and
the steps of removing the gap insulation layer and the insulation layer including a step of etching the gap insulation layer and the insulation layer.

14. A method as claimed in claim 13 including:
the step of depositing the gap insulation layer being accomplished by plasma chemical vapor deposition.

15. A method, as claimed in claim 14 including:
the step of frame plating the pole tip PT1 including frame plating a cap layer on top of the pole tip PT1.

16. A method as claimed in claim 15 including:
the cap layer being constructed of copper.

17. A method as claimed in claim 15 including:
the cap layer being constructed of NiP.

18. A method as claimed in claim 15 including:
the insulation layer and the gap insulation layer being constructed of the same material.

19. A method as claimed in claim 18 including:
the material of the insulation layer and the gap insulation layer being selected from the group of $SiO_2$ and $Si_3N_4$.

20. A method as claimed in claim 19 including:
the bottom seedlayer being a nonmagnetic material.

* * * * *